US007301100B2

(12) United States Patent
Drane et al.

(10) Patent No.: US 7,301,100 B2
(45) Date of Patent: *Nov. 27, 2007

(54) WATER RESISTANT ELECTRICAL FLOOR BOX COVER ASSEMBLY

(75) Inventors: Mark R. Drane, Germantown, TN (US); Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/484,937

(22) Filed: Jul. 12, 2006

(65) Prior Publication Data

US 2006/0249296 A1 Nov. 9, 2006

Related U.S. Application Data

(63) Continuation of application No. 10/335,230, filed on Dec. 31, 2002, now Pat. No. 7,105,745.

(51) Int. Cl.
*H02G 3/14* (2006.01)

(52) U.S. Cl. .......................... 174/67; 174/66; 174/481; 220/241; 220/242

(58) Field of Classification Search ................ 174/67, 174/48, 50, 66, 53, 58, 57, 480, 481, 482, 174/484, 487, 490, 486; 220/3.8, 4.02, 241, 220/242, 3.2, 3.3, 3.4, 3.5, 3.6, 3.7, 3.9; 292/336; 439/142, 136, 138, 535, 536
See application file for complete search history.

(56) References Cited

U.S. PATENT DOCUMENTS

| | | | |
|---|---|---|---|
| 2,271,630 A | 2/1942 | Dahlgren | |
| 2,960,254 A | 11/1960 | Kiba | |
| 3,252,611 A | 5/1966 | Weltzman et al. | |
| 3,894,654 A | 7/1975 | Frankenberg | |
| 3,956,573 A | 5/1976 | Myers et al. | |
| 4,381,063 A * | 4/1983 | Leong | 220/242 |
| 4,443,654 A | 4/1984 | Flachbarth et al. | |
| 4,883,924 A | 11/1989 | Hadfield | |
| 5,010,211 A | 4/1991 | Bartee | |
| 5,032,690 A | 7/1991 | Bloom | |
| 5,160,808 A | 11/1992 | Hadfield | |

(Continued)

OTHER PUBLICATIONS

U.S. Appl. No. 10/307,889, filed Dec. 2, 2002, Drane.

(Continued)

*Primary Examiner*—Angel R. Estrada
(74) *Attorney, Agent, or Firm*—Hoffman & Baron, LLP

(57) ABSTRACT

A floor box cover assembly including a flange having an opening therethrough to permit access to an outlet box, and a cover securable to the flange and movable between a closed position wherein the opening is covered and an open position wherein the opening is uncovered to permit access to the outlet box. The flange includes an inner wall extending about the opening. The cover is pivotably secured to the flange by a hinge. The hinge includes a resilient member and a retainer, the retainer holds the cover on the flange and permits rotation of the cover between an open and closed position. The hinge permits deflection of the resilient member such that the cover is translatable relative to the flange.

38 Claims, 14 Drawing Sheets

U.S. PATENT DOCUMENTS

| | | | |
|---|---|---|---|
| 5,195,288 A | 3/1993 | Penczak | |
| 5,272,278 A | 12/1993 | Wuertz | |
| 5,342,993 A | 8/1994 | Siems | |
| 5,382,171 A | 1/1995 | Hofmann et al. | |
| 5,393,930 A | 2/1995 | Wuertz | |
| 5,410,103 A | 4/1995 | Wuertz | |
| 5,422,434 A * | 6/1995 | Wuertz et al. | 174/487 |
| 5,466,886 A | 11/1995 | Lengyel et al. | |
| 5,541,813 A | 7/1996 | Satoh et al. | |
| 5,574,254 A | 11/1996 | Mori et al. | |
| 5,575,668 A | 11/1996 | Timmerman | |
| 5,696,349 A | 12/1997 | Bera | |
| 5,747,732 A | 5/1998 | Bera et al. | |
| 5,763,826 A | 6/1998 | Castellani et al. | |
| 5,783,774 A | 7/1998 | Bowman et al. | |
| 5,864,091 A | 1/1999 | Sumida | |
| 6,000,550 A | 12/1999 | Simpson et al. | |
| 6,018,126 A | 1/2000 | Castellani et al. | |
| 6,041,478 A * | 3/2000 | Martin | 16/385 |
| 6,046,405 A | 4/2000 | Obermann | |
| 6,114,623 A | 9/2000 | Bonilla et al. | |
| 6,133,531 A | 10/2000 | Hayduke et al. | |
| 6,175,078 B1 | 1/2001 | Bambardekar et al. | |
| 6,179,634 B1 * | 1/2001 | Hull et al. | 439/142 |
| 6,265,662 B1 | 7/2001 | Riedy et al. | |
| 6,307,152 B1 | 10/2001 | Bonilla et al. | |
| 6,395,978 B1 | 5/2002 | Whitehead et al. | |
| 6,507,485 B2 | 1/2003 | Zadesky | |
| 2003/0109172 A1 | 6/2003 | Foden et al. | |
| 2006/0231282 A1 * | 10/2006 | Greenfield | |

OTHER PUBLICATIONS

U.S. Appl. No. 10/384,190, filed Mar. 7, 2003, Drane.

TradeMaster® Floor Box and Covers, *Pass & Seymour Legrand®*, catalog description of Floor Box Covers (1999).

Thomas & Betts Electrical Components, Products and Systems *Technical/Specification Catalog* Electrical Components, catalog pp. J/830-J/867; J/897-J/900; M/990-M/996 (1994).

* cited by examiner

FIG. 2
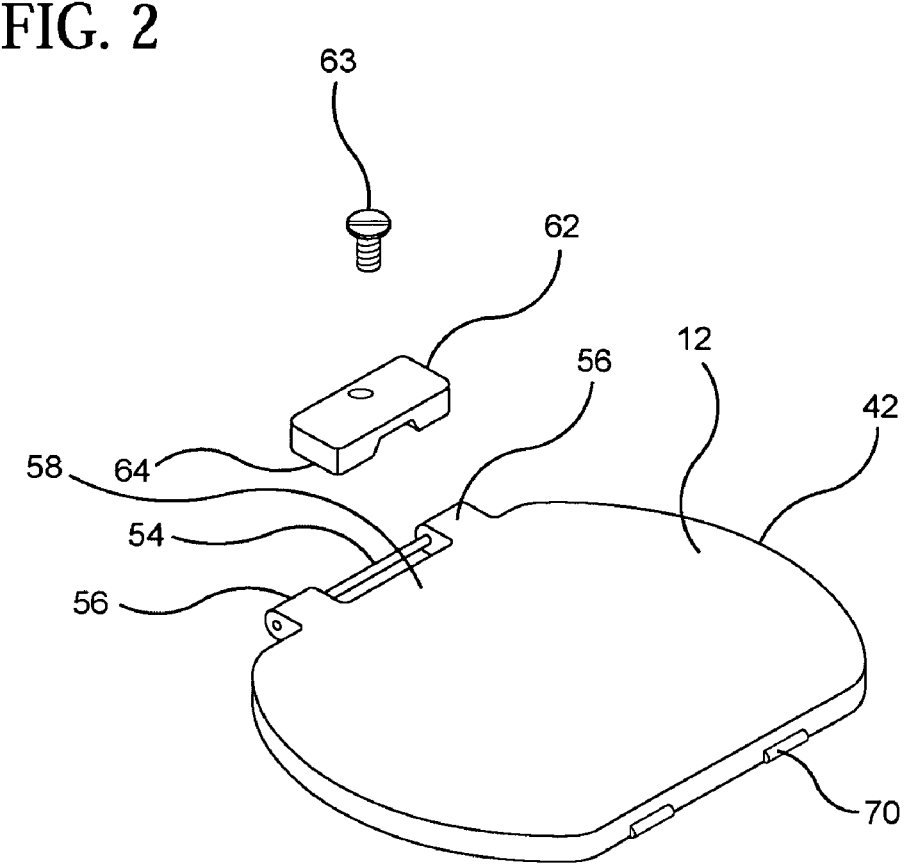
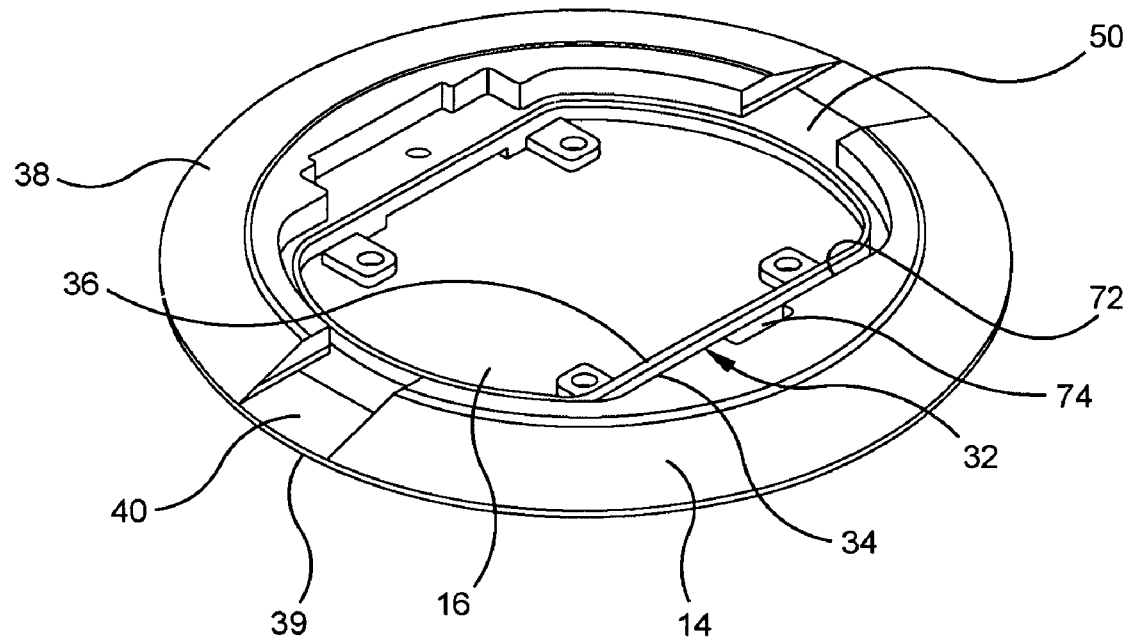

WATER RESISTANT ELECTRICAL FLOOR BOX COVER ASSEMBLY

CROSS-REFERENCE TO RELATED APPLICATIONS

This application is a continuation of U.S. patent application Ser. No. 10/335,230 filed on Dec. 31, 2002 now U.S. Pat. No. 7,105,745, the entirety of which is incorporated by reference herein.

FIELD OF THE INVENTION

The present invention relates to an electrical floor box cover assembly and more particularly to a floor box cover assembly which resists the intrusion of water.

BACKGROUND OF THE INVENTION

In office space and other commercial environments it is often desired to have access to electrical outlets or other electrical connections at locations located a distance from standard wall outlets. In order to safely accommodate such situations, floor boxes are typically used. These boxes may be located in the floor near or at the location, such as under a work cubicle or near a piece of machinery, where the connection is needed. The electrical connections may be electrical outlets, telephone jacks or data connections used for networking computers.

Floor boxes may include a flange which sits on top of the floor surface and included an opening to permit access to the electrical connections. A cover is typically removably positionable over the opening to prevent inadvertent contact with the connectors and to restrict debris from contaminating the connectors. One such covered floor box is shown in U.S. Pat. No. 6,179,634.

Covers may be designed to also restrict the entry of water through the opening. Floor boxes may be exposed to water when the floors are cleaned or from inadvertent spillage. Floor box covers used on tile or cement floors may be subjected to a significant amount of cleaning water as the floors are cleaned. Floor box covers located on carpeted floors are typically less likely to be subjected to water as the floors are cleaned by waterless methods. However, the use of stream cleaners does subject the cover to water.

In order to prevent water from intruding past the cover and onto the electrical connections below, a gasket is typically used. The gasket may be placed between the cover and the flange as shown in U.S. Pat. No. 6,265,662 or between the cover and a face plate as in U.S. Pat. No. 6,179,634. Without the use of the gasket, the covers in these two patents and in typical floor box covers will permit water to enter through the opening. Gaskets are typically made from a resilient material which can degrade over time rupture or become separated from its seat. If any of these events should occur, the cover is vulnerable to water intrusion and the electrical components will be exposed to water. This may result in degradation of the connections from corrosion and/or short circuiting. Furthermore, water which passes by the gasket is not diverted away from the opening, but is permitted to flow off the flange into the opening.

Accordingly, it would be desirable to provide a floor box cover which resists the intrusion of water without the use of a sealing gasket and diverts water away from the cover opening.

SUMMARY OF THE INVENTION

It is an advantage of the present invention to provide an electrical floor box cover assembly.

It is also an advantage of the present invention to provide a water resistant electrical floor box assembly.

It is another advantage of the present invention to provide a water resistant electrical floor box assembly which directs water away from the opening.

It is a further advantage of the present invention to provide a water resistant electrical floor box assembly which includes a cover including a biasing device for retaining the cover in the closed position.

It is yet a further advantage of the present invention to provide an electrical floor box cover assembly having a cover which lays substantially flat when fully open.

In the efficient attainment of these and other advantages, the present invention provides an electrical floor box cover assembly including a cover and a flange with the cover being securable to the flange and movable between an open and closed position. The flange defines an opening adapted to permit access to electrical connectors. The flange includes an inner wall and an outer wall extending about the opening and a channel disposed between the inner and the outer walls. The outer wall includes an interruption formed therein providing a path out of the channel, the slots permitting water in the channel to exit therefrom away from the opening.

The cover includes an outer periphery extending over the channel to restrict water from entering the channel. The inner wall defines the opening and the flange is bounded by a tapered surface, the interruption extends through the tapered surface to permit water in the channel to run off of the flange away from the opening.

The cover is pivotably secured to the flange by a hinge. In the preferred embodiment, the hinge includes a projection extending from the cover and the flange has a depression for receiving the projection. The hinge further includes a hinge pin disposed on the cover, and a retainer securable to the flange over the pin. The retainer holds the cover on the flange and permits rotation of the cover between an open and closed position. The pin includes a pair of opposed ends which are supported on the cover. The pin is resilient and the retainer prevents translational movement of a central portion of the pin and permits movement of lateral portions of the pin such that the cover can translate to effect locking and unlocking of the cover in the closed position.

The present invention also provides a floor box cover assembly including a flange having an opening therethrough to permit access to an outlet box, and a cover securable to the flange and movable between a closed position wherein the opening is covered and an open position wherein the opening is uncovered to permit access to the outlet box. The flange includes an inner wall extending about the opening. The cover is pivotably secured to the flange by a hinge. The hinge includes a resilient member and a retainer, the retainer holds the cover on the flange and permits rotation of the cover between the open and closed position. The hinge permits deflection of the resilient member such that the cover is translatable relative to the flange.

The present invention may further provide a floor box cover assembly having a flange including an opening therethrough to permit access to an outlet box. A cover is pivotably securable to the flange by a hinge and movable between a closed position wherein the opening is covered and an open position wherein the opening is uncovered to permit access to the outlet box. The hinge includes a pair of spaced projections extending from the cover and the flange having a depression that receives the projections. The hinge further includes a resilient hinge pin disposed on the cover between the projections. A retainer is securable to the flange over the pin. The retainer holds the cover on the flange and permits rotation of the cover between the open and closed position. The hinge permits translational and rotational movement of the cover.

The present invention may still further provide a floor box cover assembly having a flange including an opening therethrough to permit access to an outlet box. A cover is securable to the flange and movable between a closed position wherein the opening is covered and an open position wherein the opening is uncovered to permit access to the outlet box. The flange includes an inner wall and an outer wall extending about the opening, the inner and the outer walls defining a channel disposed therebetween. The cover is pivotably securable to the flange by a hinge. The hinge including a resilient member that permits rotational and translational movement of the cover relative to the flange. The cover and outer wall form a gap therebetween when said cover is in the closed position. The gap permits the cover to translate relative to the flange when in the closed position.

BRIEF DESCRIPTION OF THE DRAWINGS

FIG. 2 is an exploded top perspective view of the floor box cover of FIG. 1.

DETAILED DESCRIPTION OF THE PREFERRED EMBODIMENTS

Figure 1:
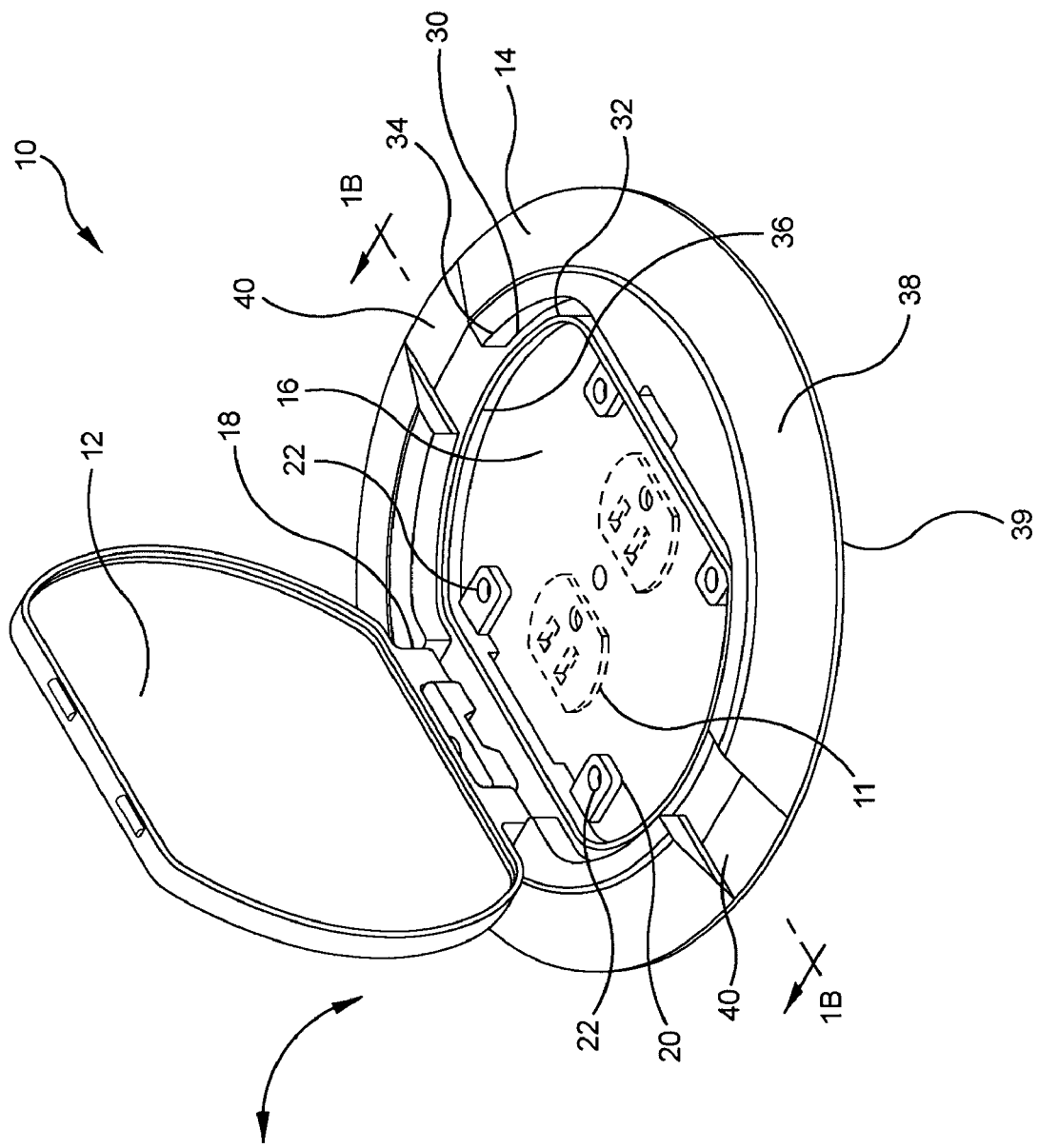
FIG. 1 is a top perspective view of the floor box cover assembly of the present invention showing the cover in an open position.

The present invention provides a floor box cover which sits on top of an electrical box positionable in a floor. The electrical box may include connections for power or voice/data devices. The floor box cover of the present invention provides an improved resistance to water thereby maintaining the covered electrical connections dry and free from contamination. Water resistance is achieved through use of a channel which diverts water away from the cover and the electrical box below.

With reference to FIGS. 1-4, floor box cover assembly 10 includes a cover 12 which is securable to flange 14 such that cover 12 is movable to selectively cover and uncover an opening 16 to provide access to electrical connectors 11 held within the outlet box 13. In the preferred embodiment, cover 12 is pivotably attached to flange 14 by hinge 18. Flange 14 is preferably a generally annular member having a central opening 16 through which access to the electrical connectors 11 is obtained. It is within the contemplation of the invention that flange 14 could be of any one of a variety of shapes, e.g., round, square, rectangular, etc., to conform to the shape of the outlet box 13 disposed below. Cover flange 14 which may be formed of a metallic or plastic material includes tabs 20 having apertures 22 to permit fasteners (not shown) to pass through and into corresponding apertures in the outlet box 13. Flange 14 provides a transition from the surrounding floor to the outlet box and may be placed over a variety of floor surfaces including carpet, wood or tile.

Figure 1A:
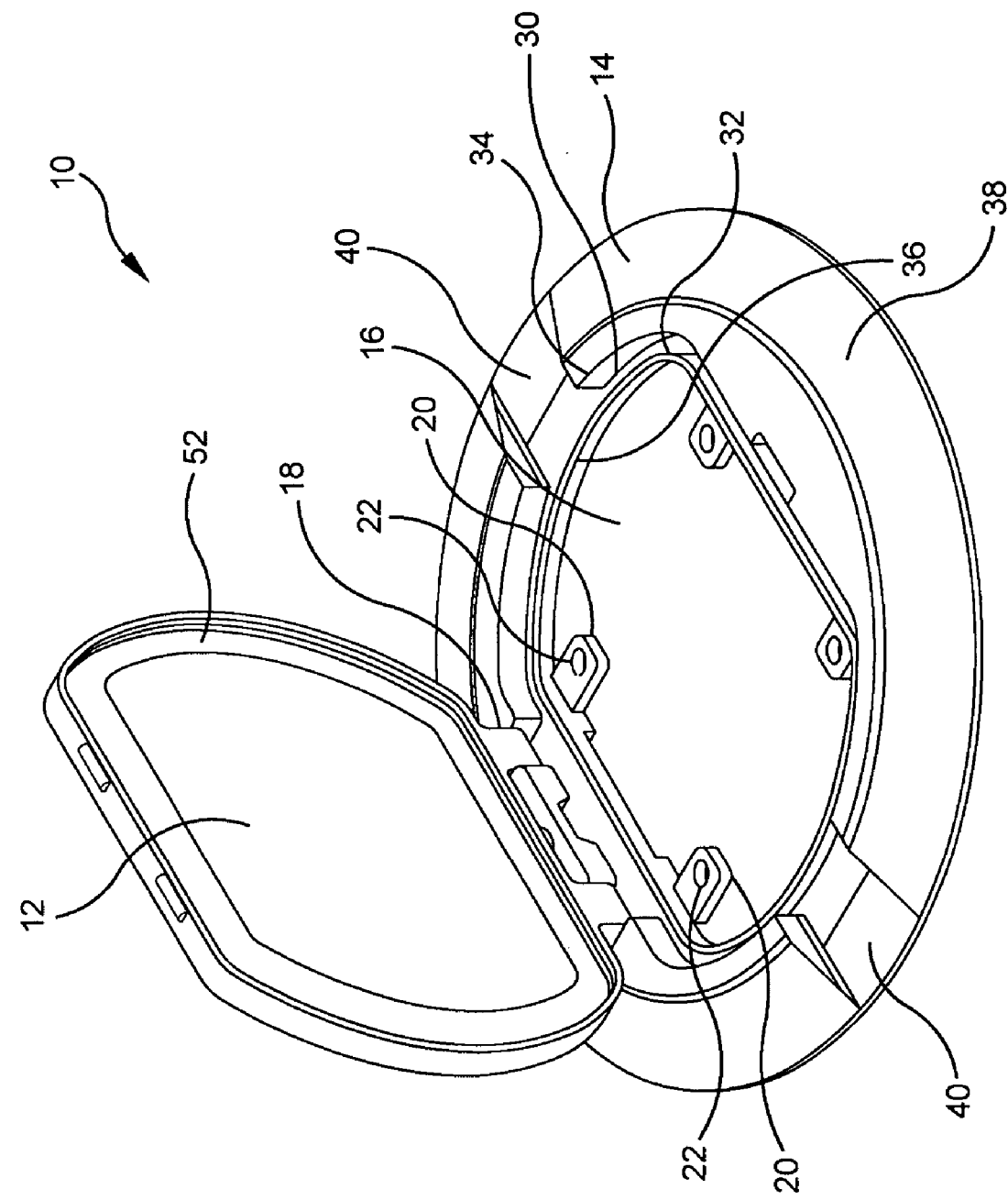
FIG. 1A is a top perspective view of an alternative embodiment of the floor box cover assembly of the present invention showing the cover in an open position.
Figure 1B:
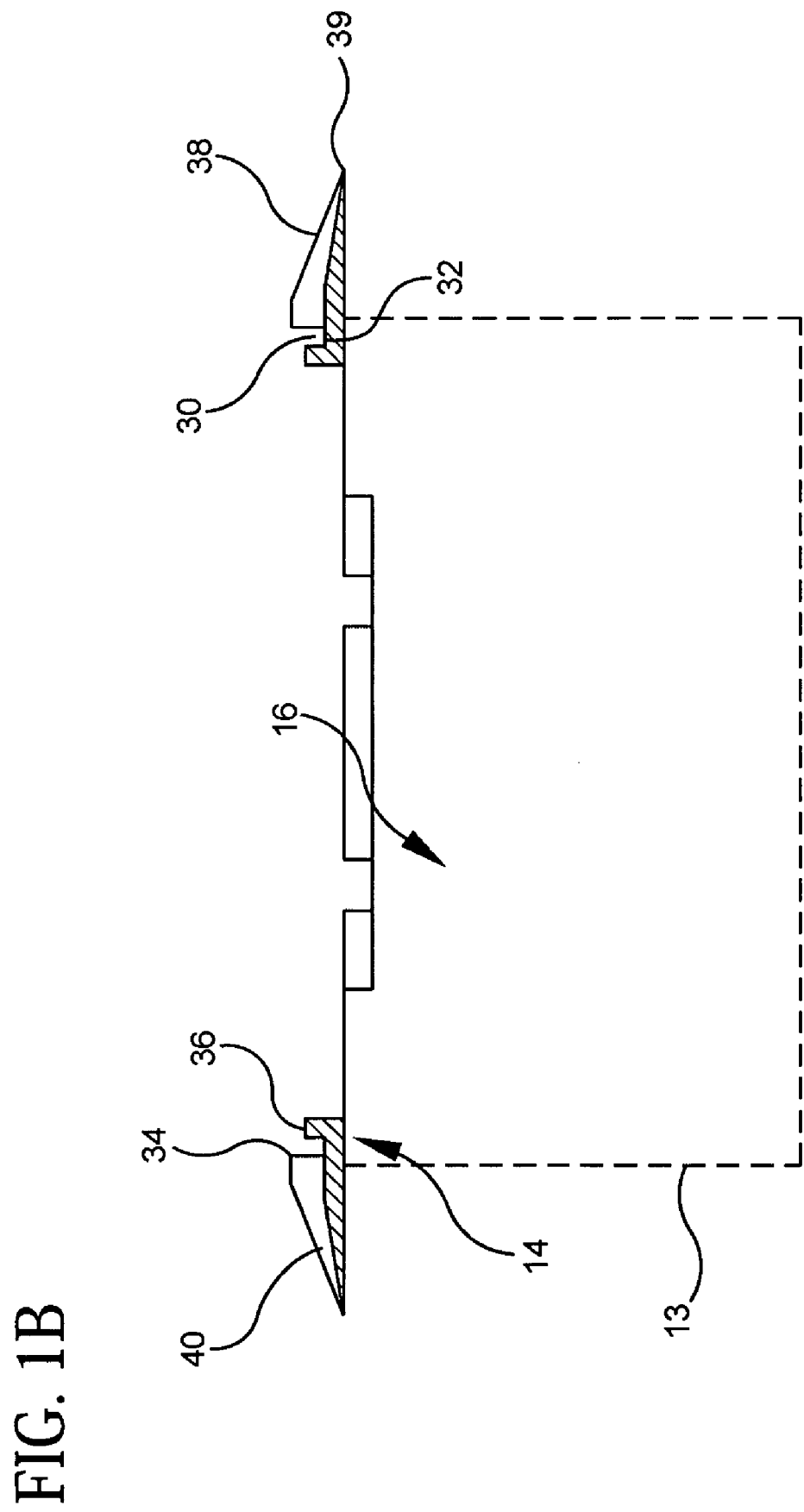
FIG. 1B is a cross-sectional view of the floor box cover assembly taken along line IB-IB of FIG. 1.

Referring additionally to FIG. 1B, flange 14 includes an annular channel 30 extending about opening 16 and has a bottom 32 peripherally bounded by an upstanding outer wall 34 and an upstanding inner wall 36. Extending radially beyond outer wall 34 is an annular beveled surface 38 which ends at the peripheral edge 39 of the flange 14. When an electrical box 13 is installed, cover flange 14 and cover 12 are slightly raised above the surface of the floor. Beveled surface 38 provides a smooth tapered transition from the floor to prevent tripping. Flange 14 further includes a plurality of slots 40 formed in the outer wall 34 and beveled surface 38 which creates interruptions in outer wall 34. Channel 30 and slots 40 provide a water resistance feature to the present invention which will now be described.

Floor boxes may be subjected to water that is used in floor cleaning or from accidental spillage. Floor box cover assembly 10 provides resistance to the intrusion of water into opening 16 and protects the electrical connectors 11 found beneath the cover in the outlet box 13. When cover 12 is in the closed position, a radially outer portion 42 of the cover extends over a portion of channel 30 to restrict water from entering channel 30. Accordingly, most of the water will run off the cover and down the beveled surface 38 of cover flange 14. A narrow gap 50 exists between the outer edge of cover 12 and cover flange 14. With cover 12 is in the closed position, water that is not shed directly off will instead be diverted to channel 30 through gap 50. Inner wall 36, which extends above channel bottom 32 and the bottom of slots 40, restricts the water collected in channel 30 from entering the opening 16. The water in channel 30 will then drain out through slots 40. Accordingly, when the cover 12 and cover flange 14 are exposed to water such as when the floors are cleaned or when a liquid is spilled, the liquid will be shed away and not permitted to seep into the opening 16 to the electrical connectors 11. Channel 30 may be pitched such that any water that enters the channel 30 is directed to the slots 40. Furthermore, due to the use of the channel 30 and slots 40, no gasket is necessary between cover 12 and flange 14 in order to prevent water from intruding. Cover 12 may be employed in carpeted floors which may be subjected to cleaning water such as from steam cleaning.

In an alternative preferred embodiment shown in FIG. 1A, a gasket 52 may be placed between cover 12 and cover flange 14 to create an even greater resistance to water infiltration. Cover 12 may include a groove disposed in the undersurface thereof. Gasket 52 may be sized to fit within groove and be held in place by a friction fit or adhesive. When cover 12 is in the closed position, gasket 52 is engaged and a waterproof seal is created between cover 12 and flange 14. Accordingly, any water which enters channel 30 is not only drained away through the slots but is also prevented from entering the opening by a gasket-tight seal. Even if water should get past the gasket it still may be drained out through the slots 40, thereby preventing water from entering opening 16. This embodiment provides an even higher degree of water intrusion resistance and would be suitable for use in tile floor applications which could be subjected to standing water.

Figure 4:
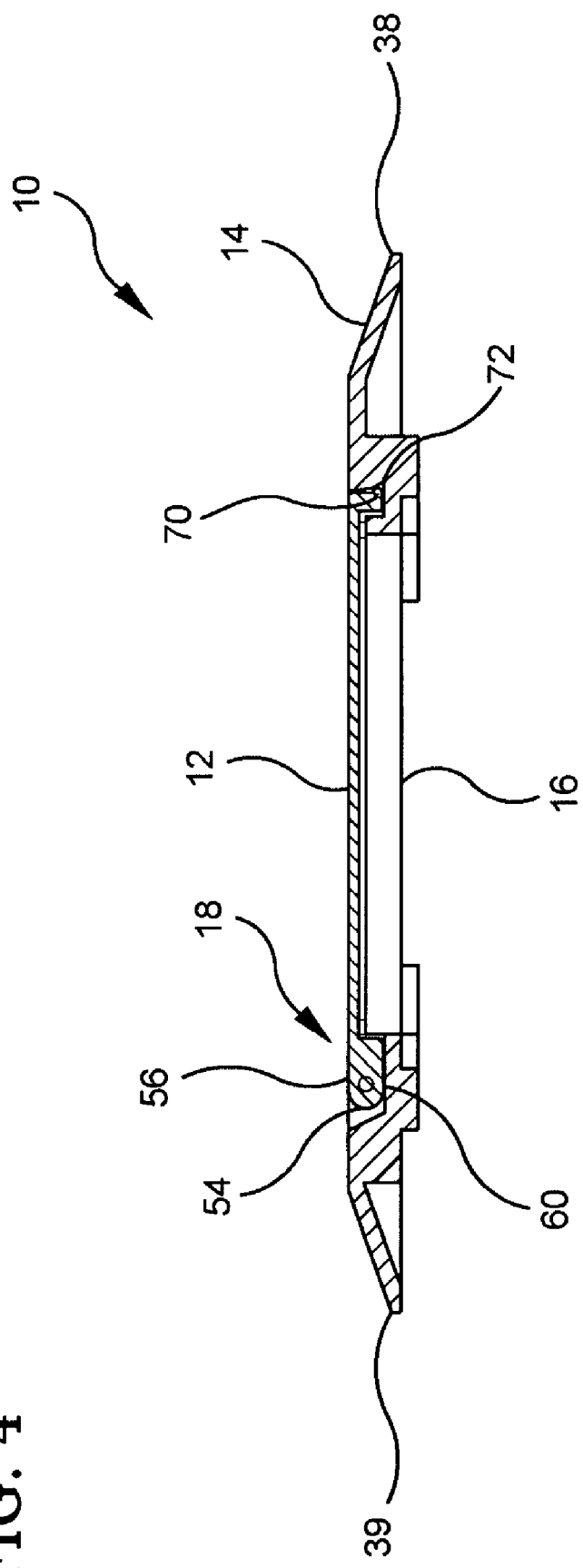
FIG. 4 is a cross-sectional view of the floor box cover assembly taken along line IV-IV of FIG. 3.
Figure 5:
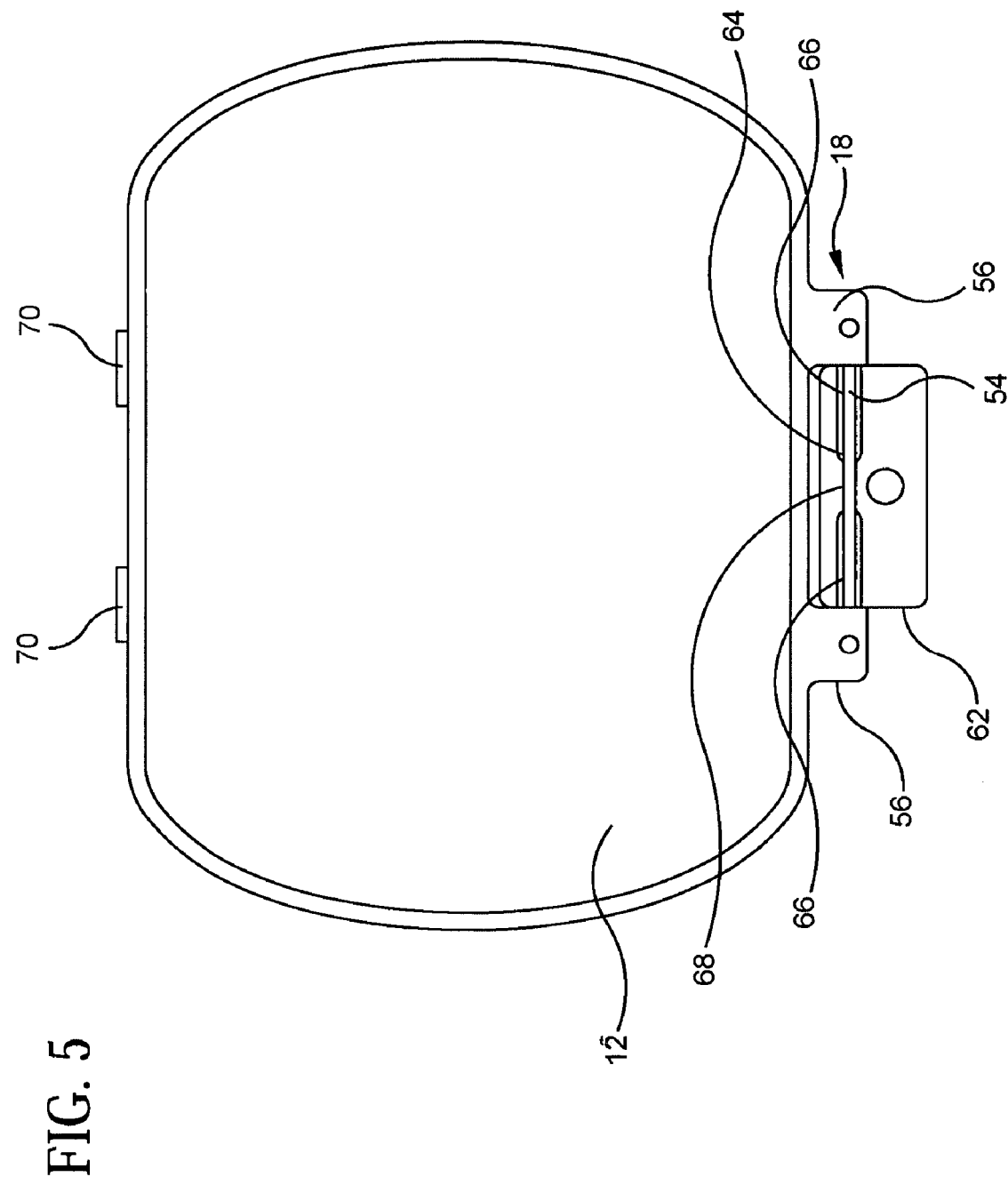
FIG. 5 is a bottom elevational view of the bottom surface of the cover and the retainer of FIG. 1 showing the cover in the normal state.
Figure 6:
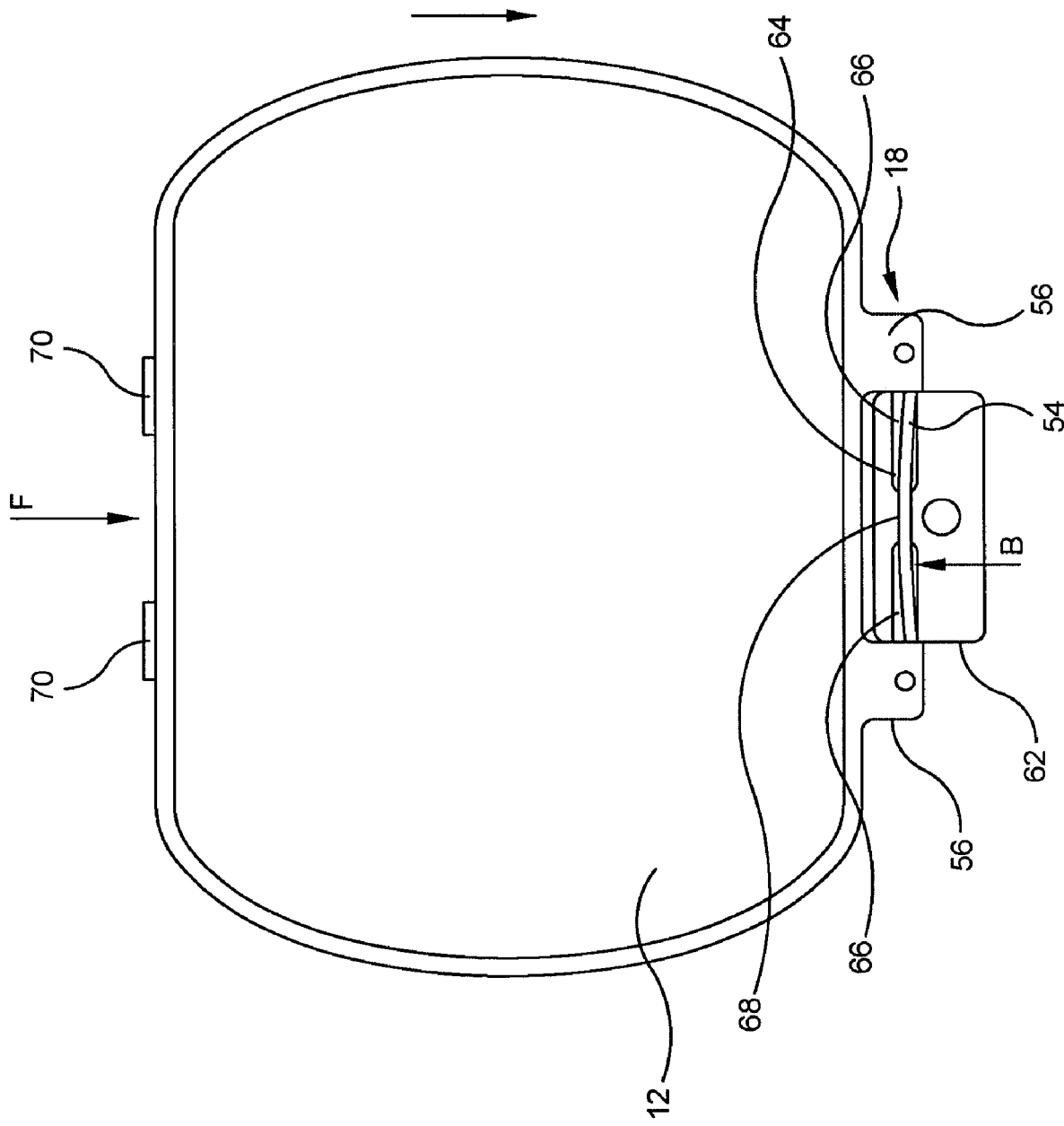
FIG. 6 is a top plan view plan view of the bottom surface of the cover and the retainer of FIG. 5 showing the cover in the deflected position.
Figure 7:
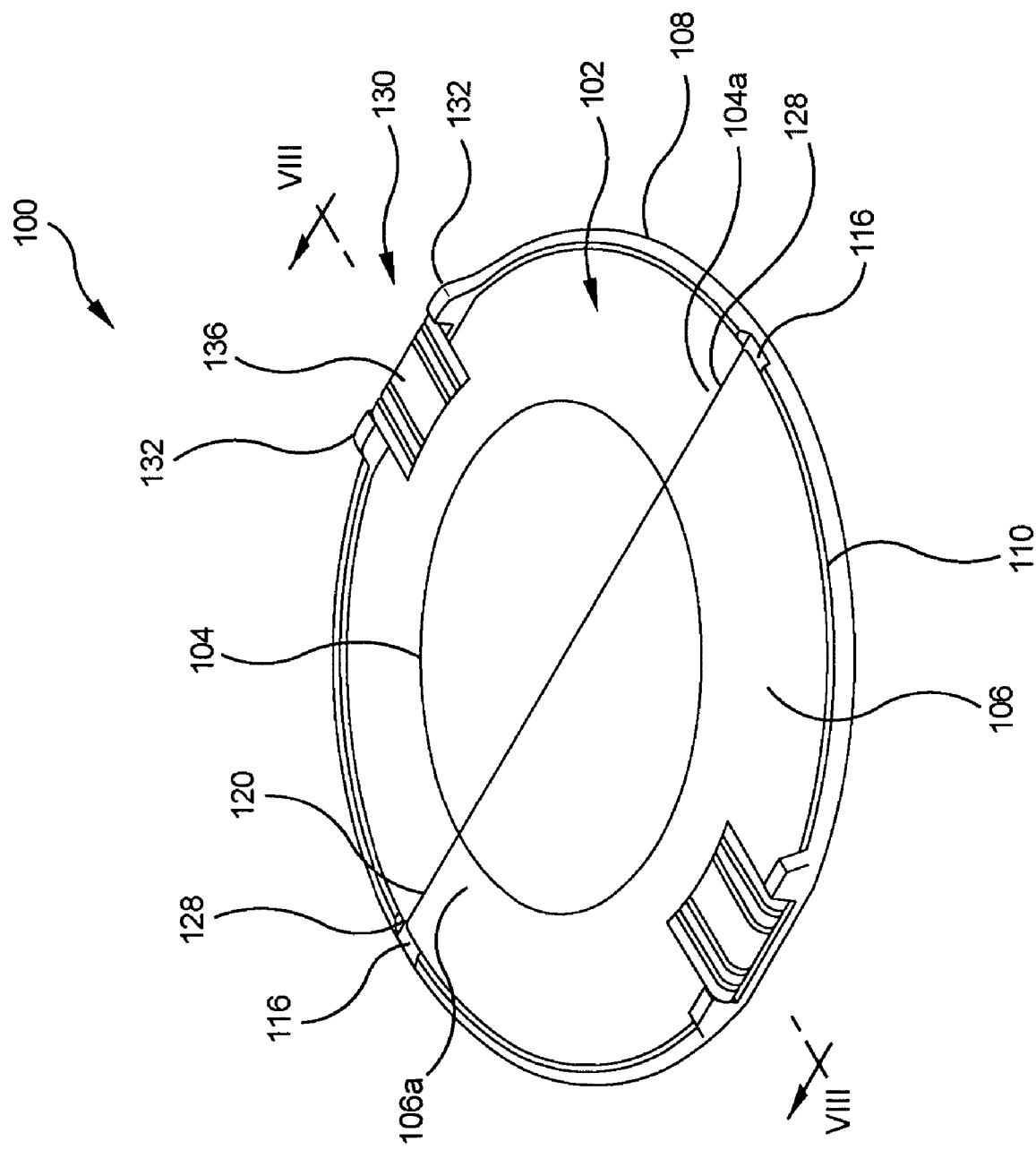
FIG. 7 is a perspective view of an alternative embodiment of the present invention.
Figure 8:
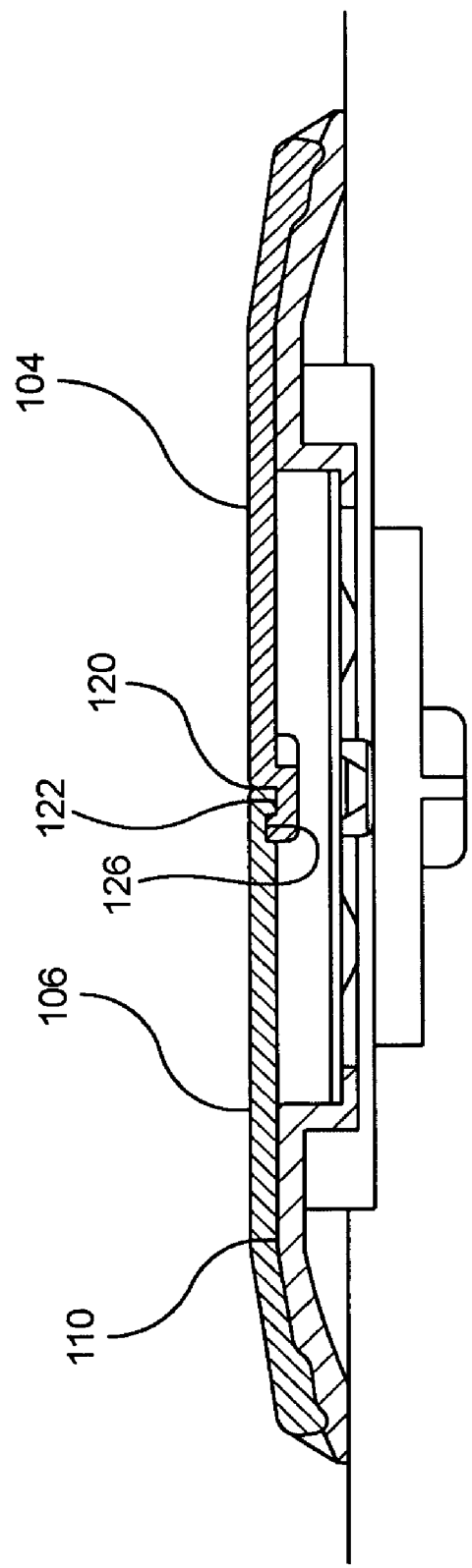
FIG. 8 is a cross-sectional view of the floor box cover assembly taken along line VIII-VIII of FIG. 7.

Referring FIGS. 2 and 5-6, in the preferred embodiment, cover 12 rotates between the open and closed position by way of hinge 18 which provides the pivotal connection between cover 12 and flange 14. Hinge 18 may also assist in retaining cover 12 in the closed position. Hinge 18 may include a pin 54 extending between and secured in a pair of spaced tabs 56 extending from the back edge 58 of the cover 12. Pin 54 may be formed of a resilient material such as steel. Flange 14 may include a hinge seat 60 in which tabs 56 and pin 54 may be disposed. A retainer 62 may be positioned over pin 54 and be fastened to flange 14 via screw 63. Retainer 62 includes an under surface including a longitudinally extending groove 64 for receiving pin 54. Groove 64 may include a central portion 68 which fits in close relationship to pin 54 to hold the pin 54 against translational movement. Groove 64 also includes a pair of peripheral portions 66 extending from central portion 68 to the edge of the retainer 62. Groove 64 in peripheral portions 66 is widened such that a clearance is provided around the pin 54 to permit translational movement of pin 54. With the hinge 18 formed in this manner, translational movement of cover 12 by a force F in a direction toward hinge 18, causes pin 54 to flex and cover 12 to translate as shown in FIG. 6. When pin 54 is flexed, it creates a biasing force B acting against the rearward movement of cover 12 and urges cover 12 to a forward position. The front edge of cover may include a projection 70 which includes a corresponding recess 72 in flange 14. When cover 12 is rotated in to the closed position, projection 70 engages a portion of flange 14 causing cover 12 to translate against the biasing force of pin. As shown in FIG. 4, when cover 12 is moved to the final closed position, projection 70 enters recess 72 and cover translates forward. Projection 70 is positioned in recess 72 thereby restricting the movement of cover 12 into the open position.

Figure 3:
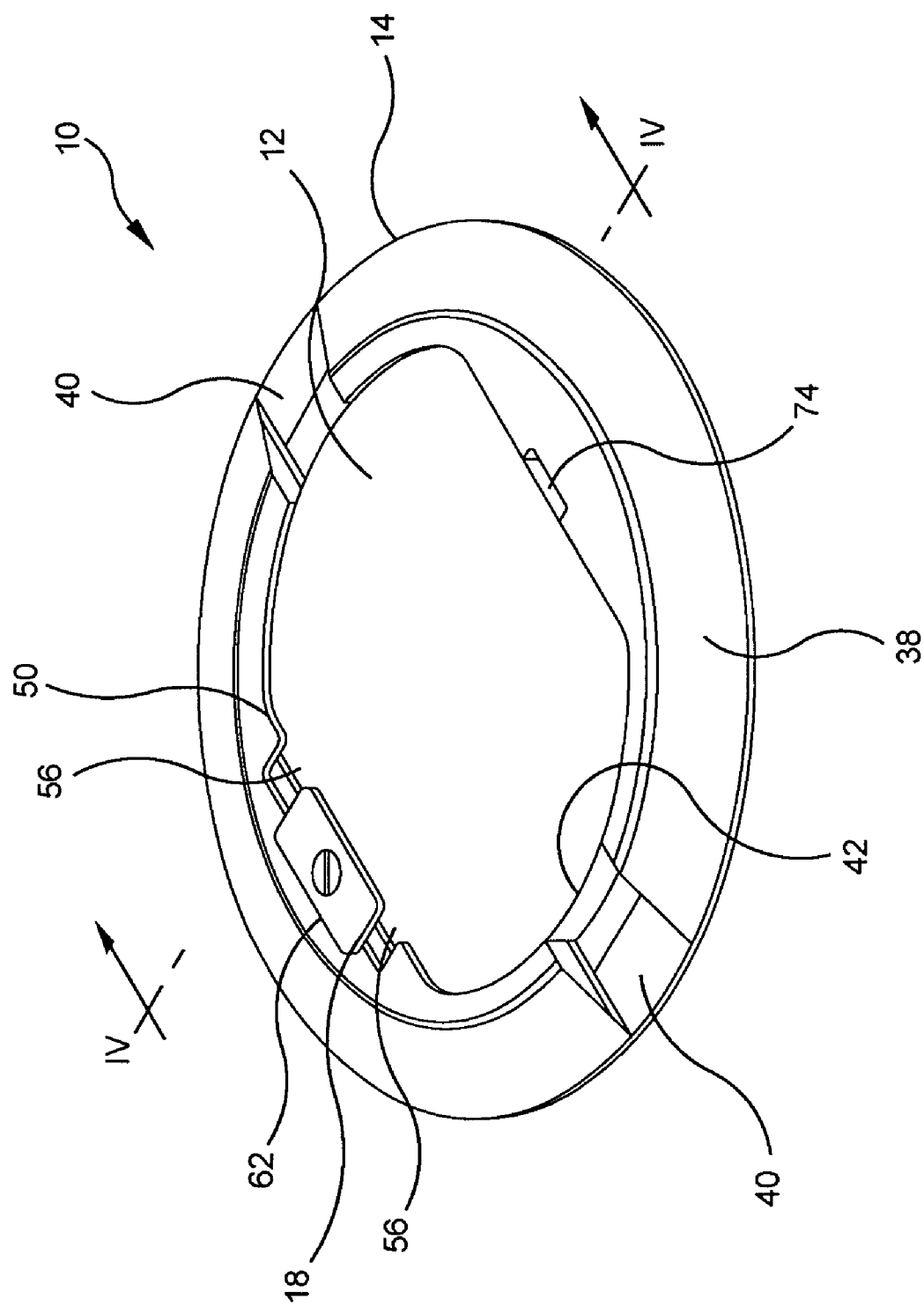
FIG. 3 is a top perspective view of the floor box cover of FIG. 1 showing the cover in the closed position.

Referring additionally, to FIG. 3, in order to open cover 12 to obtain access to the electrical connections 11 lying below, a user would move cover in a direction toward hinge 18 and against the biasing force of pin 54. Gap 50 created between cover 12 and the outer wall 34 of flange 14 permits a degree of translational movement of cover 12. Cover projection 70 moves out of recess 72 and cover 12 may be rotated toward the open position. This opening procedure may be easily done by inserting a screwdriver or similar tool into a notch 74 formed in flange 14 and prying up cover 12.

It is also within the contemplation of the present invention that the hinge connection between cover 12 and flange 14 may include a variety of known hinge structures including tabs supported on the cover 12 having protrusions insertable within indentations in flange 14. Also, the pin 54 could be securely retain throughout its length and not permitted to flex as in the preferred embodiment. The locking mechanism could include a rotary latch such as a ¼ turn latch or other latching device known in the art.

In an alternative embodiment shown in FIGS. 7 to 11, floor box cover assembly 100 may include a split cover with the cover 102 being formed of two sections 104, 106 pivotably mounted to a flange 108. Cover 102 covers up an opening 109 which creates access to electrical connectors. In the embodiment shown, opening 109 includes a formed section 109a which provides cutouts 109b to accommodate the electrical connectors. The two cover sections 104 and 106 include adjoining edges, 104a and 106a respectively, which when closed form a seam 120 running down the center of the cover 102. Flange 108 includes a tapered edge 110 which is partially covered by cover sections 104 and 106 when in the closed position. Water will run off the cover sections onto tapered edge 110 away from cover 102. In order to prevent water from entering the opening 109 through the center seam 120 one of the cover sections 104, includes an upwardly facing U-shaped groove 122 extending along the straight adjoining edge thereof. The other cover section 106 includes a corresponding grooved edge 126 which is inverted with respect the grooved edge 122 of cover section 104. When in the closed position the grooved sections 122, 126 interlock. This creates a restriction for water to enter between the cover sections 104, 106 and most water falling upon the cover 102 will be diverted away. Any water which enters through the center seam 120 between the cover sections will enter the upwardly facing groove 122 of cover section 104. Groove 122 has two ends 128 which terminate over tapered slots 116 formed in flange 108. Water that may collect in the groove 122 will be channeled to the outer periphery of the cover 102 where it falls into one of the slots 116 which are aligned with the ends of seam 120. Accordingly, water will be diverted away from the opening keeping the electrical connections dry.

Figure 9:
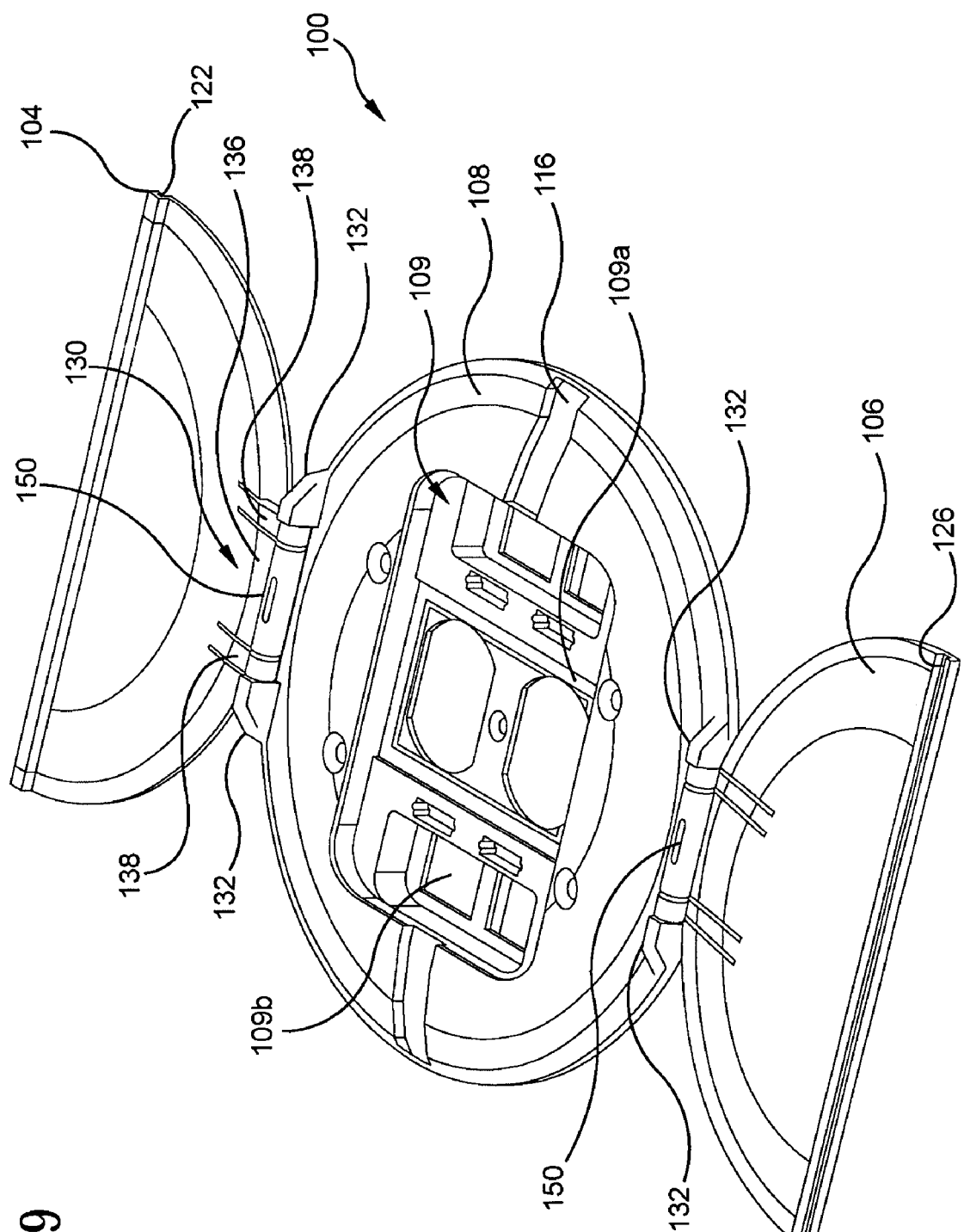
FIG. 9 is a top perspective view showing the cover in an open position of the invention of FIG. 7.
Figure 10:
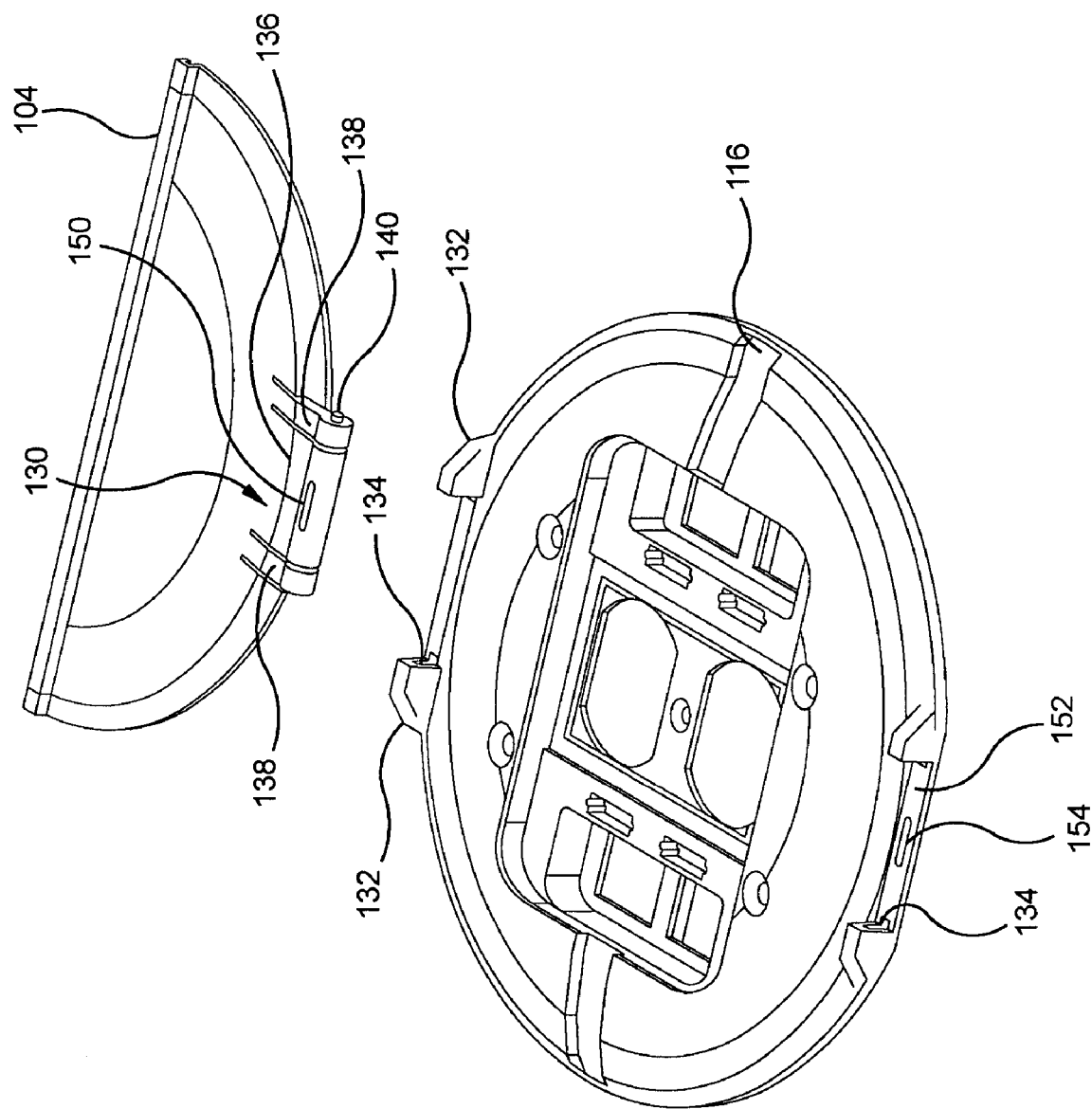
FIG. 10 is an exploded top perspective view of the invention of FIG. 7 with one of the cover sections removed for clarity.
Figure 11:
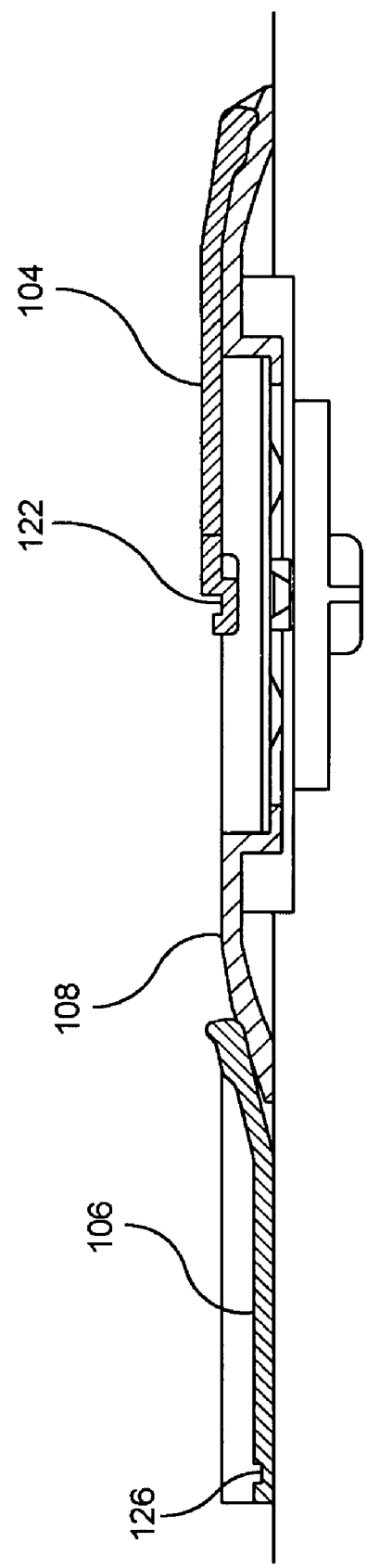
FIG. 11 is a cross-sectional view of the floor box cover assembly of FIG. 7 showing one of the cover sections in the fully open position and the other cover section in the fully closed position.

In this embodiment cover sections 104, 106 may be pivotably attached to the flange 108 such that they lay substantially flat on the floor when in the fully open position as shown in FIGS. 9 and 11. Each cover section 104, 106 is attached with a similarly formed hinge 130, therefore, hinge 130 will be described with respect to one cover section. With reference to FIG. 10, a portion of flange 108 outer surface may include a pair of spaced upstanding hinge structures 132 which include indentations 134. Cover section 104 includes an extension 136 having a pair of spaced flexible resilient tabs 138 each having a pin 140 extending outwardly in opposing directions. The pins 140 may be snap fit into the indentations 134 of the hinge structures 132 thereby creating a pivotable connection between the cover section 104 and flange 108. Between the hinge structures 132, the flange 108 tapers downwardly creating a pocket 152 for receiving the hinge section 136 extending from the cover 104 section. This permits the cover section 104 to rotate approximately 180 degrees and lie flat against the surrounding floor when in the fully open position. Preferably, cover section 104 when open extends no higher than the top of flange 108. This flat orientation limits interference with surrounding structures.

In order to maintain cover sections in the closed position, pocket 152 may include a depression 150 which cooperates with a bump 154 on cover extension 136. As cover section 104 is moved into the closed position, the bump 154 snaps into the depression 150. Some effort must be exerted on the cover section to then move it out of the closed position as the bump 154 is captured in the depression 150. Cover sections 104, 106 are preferably formed of a resilient material such as plastic or metal such that a degree of flexibility exist allowing the snap fit cooperation between bump 154 and depression 150. In an alternative embodiment (not shown), the bump may be formed on the flange and the cooperating depression formed on the cover.

Figure 12:
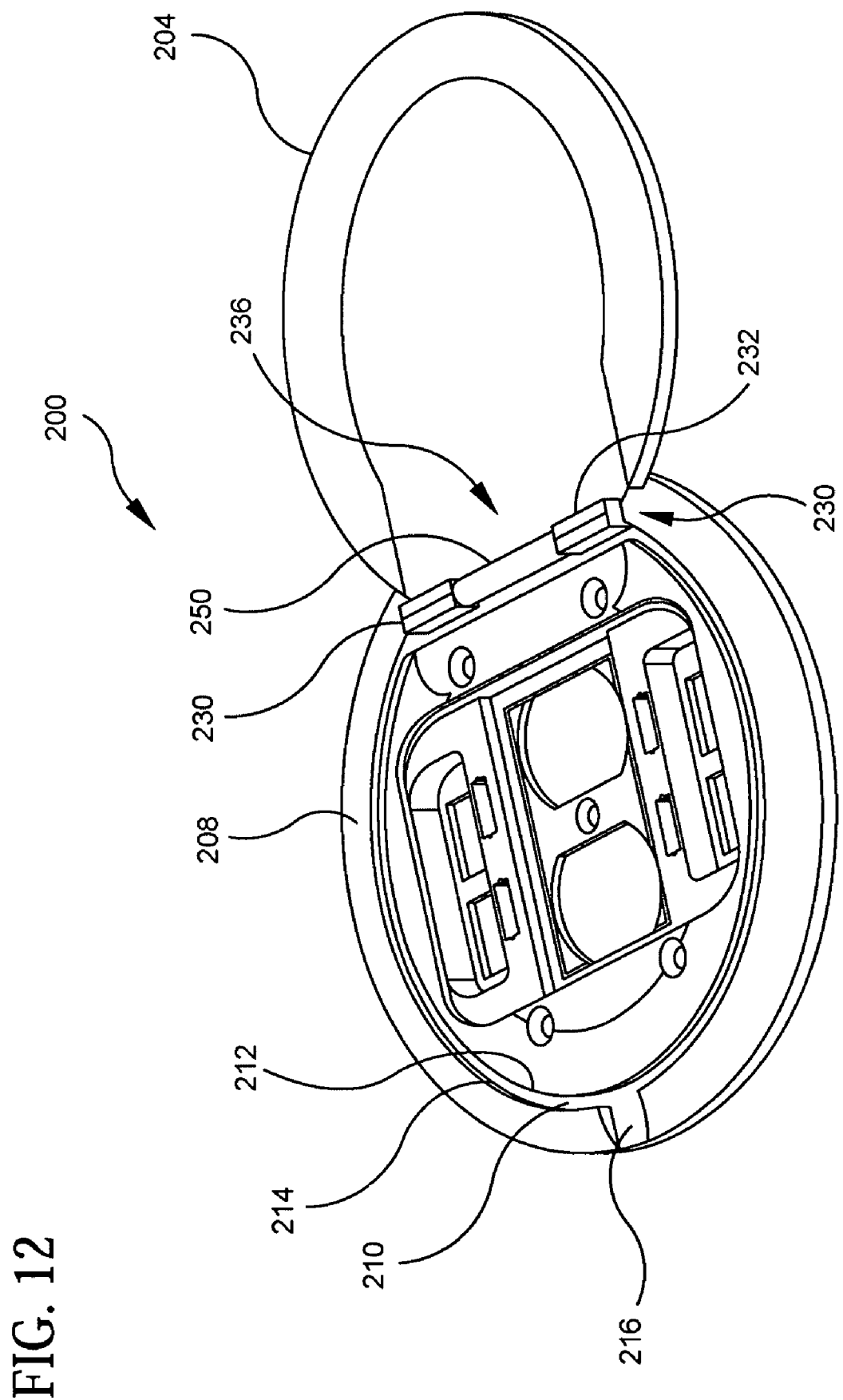
FIG. 12 is a top perspective view of a further alternative embodiment of the floor box electrical assembly of the present invention.

Referring to FIG. 12, a further alterative embodiment is shown having a single cover 204 when in the open position is allowed to lie flat. The cover assembly 200 has a flange 208 with a cover 204 attached using hinge 230. Flange 208 has a similar channel 210 as described in the embodiment shown in FIGS. 1-4 having an inner wall 212, an outer wall 214 and a slot 216 to allow water trapped within channel 210 to drain away from cover 204. Hinge 230 may be similarly constructed as the hinge described in the embodiment shown in FIGS. 7-11 which has two upstanding extensions 232 having indentations (not shown). Cover 204 also includes an extension 236 which has pins (not shown) which are inserted into the indentations in the upstanding extensions 232. The pins allow for pivotal movement of the cover 204 to be from a closed to open position. As in the prior embodiment, flange 208 tapers down to form a pocket 250 for receiving the extension 236 of the cover 204 when it is in an open position and can lie substantially flat and rotate approximately 180° so that it is in contact with the surrounding floor. Preferably, the cover section 204 extends no higher than the top of the hinge extension 232. This flat orientation limits interference by the cover 204 with any objects around the cover assembly 200 when in an open position.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A floor box cover assembly comprising:
    a flange including an opening therethrough to permit access to an outlet box;
    a cover securable to the flange and movable between a closed position wherein the opening is covered and an open position wherein the opening is uncovered to permit access to the outlet box; the flange including an inner wall extending about the opening; and
    the cover is pivotably secured to the flange by a hinge, the hinge including a resilient member and a retainer, the retainer holding the cover on the flange and permitting rotation of the cover between an open and closed position, and wherein the hinge permits deflection of the resilient member such that the cover is translatable relative to the flange.

2. The floor box cover assembly as defined in claim 1, wherein the resilient member is disposed on the cover, and the retainer is securable to the flange over the resilient member.

3. The floor box cover assembly as defined in claim 2, wherein the resilient member creates a biasing force which releasably retains the cover in the closed position.

4. The floor box cover assembly as defined in claim 1, wherein the hinge prevents translational movement of a first portion of the resilient member and permits movement of a second portion.

5. The floor box cover assembly as defined in claim 4, wherein the resilient member first portion is disposed between the second portion.

6. The floor box cover assembly as defined in claim 1, further including a gasket disposed between the cover and the flange to prevent liquid from entering the opening.

7. The floor box cover assembly as defined in claim 6, wherein the cover includes an undersurface and the gasket is retained on the cover undersurface.

8. The floor box cover assembly as defined in claim 7, wherein the gasket is retained on the cover such that the gasket engages the inner wall when the cover is in the closed position.

9. The floor box cover assembly as defined in claim 1, wherein the cover includes a portion that upon movement of the cover into the closed position, the portion of the cover engages the flange resulting in the cover being releasably retained in the closed position and restricted from moving into the open position.

10. The floor box cover assembly as defined in claim 1, wherein the cover includes a first and second section each being pivotably secured to the flange, the first and second sections having adjoining edges forming a seam positioned over the opening.

11. The floor box cover assembly as defined in claim 10, wherein the first section edge includes an upwardly opening groove extending over the opening.

12. The floor box cover assembly as defined in claim 11, wherein the second section edge extends into the groove and restricts the flow of liquid into the groove.

13. A floor box cover assembly comprising:
    a flange including an opening therethrough to permit access to an outlet box; and
    a cover pivotably securable to the flange by a hinge and movable between a closed position wherein the opening is covered and an open position wherein the opening is uncovered to permit access to the outlet box, the hinge including a pair of spaced projections extending from the cover and the flange having a depression that receives the projections, the hinge further including a resilient hinge pin disposed on the cover between the projections, and a retainer securable to the flange over the pin, the retainer holding the cover on the flange and permitting rotation of the cover between the open and closed position, and the hinge permitting translational and rotational movement of the cover.

14. The floor box cover assembly as defined in claim 13, wherein the flange includes an outer wall and an inner wall extending about the opening, the inner and the outer walls defining a channel disposed therebetween.

15. The floor box cover assembly as defined in claim 13, wherein the inner wall extends upwardly from a base of the channel and uninterrupted about a periphery of the opening.

16. The floor box cover assembly as defined in claim 14, wherein the flange outer wall includes a slot providing a path out of the channel, the slot permitting liquid in the channel to exit therefrom away from the opening.

17. The floor box cover assembly as defined in claim 14, wherein the inner wall defines the opening.

18. The floor box cover assembly as defined in claim 13, wherein the flange is peripherally bounded by a tapered surface.

19. The floor box cover assembly as defined in claim 14, wherein the cover includes an outer periphery extending over at least a portion of the channel to restrict liquid from entering the channel.

20. The floor box cover assembly as defined in claim 13, wherein the cover is releasably retained in the closed position.

21. The floor box cover assembly as defined in claim 13, wherein the retainer includes a groove having a central portion which closely retains the pin and lateral portions which permits the movement of end portions of the pin.

22. The floor box cover assembly as defined in claim 13, wherein the pin creates a biasing force which releasably retains the cover in the closed position.

23. The floor box cover assembly as defined in claim 13, further including a gasket disposed between the cover and the flange to prevent liquid from entering the opening.

24. The floor box cover assembly as defined in claim 23, wherein the cover includes an undersurface and the gasket is retained on the cover undersurface.

25. The floor box cover assembly as defined in claim 24, wherein the gasket is retained on the cover such that the gasket engages the flange when the cover is in the closed position.

26. The floor box cover assembly as defined in claim 13, wherein the cover is pivotably secured to the flange and lies substantially flat when in the open position.

27. The floor box cover assembly as defined in claim 26, wherein the cover when in the open position does not extend above an outer wall of the flange.

28. The floor box cover assembly as defined in claim 13 wherein the cover, when in the closed position is substantially flush with an upper surface of the flange.

29. The floor box cover assembly as defined in claim 13, wherein the cover includes a portion that selectively engages the flange, and upon movement of the cover into the closed position, that portion of the cover engages the flange resulting in the cover being releasably retained in the closed position and restricted from moving into the open position.

30. The floor box cover assembly as defined in claim 13, wherein the pin includes a first portion that deflects to permit translational movement of the cover.

31. The floor box cover assembly as defined in claim 30, wherein the pin includes a second portion that is prevented from deflecting by the retainer.

32. The floor box cover assembly as defined in claim 31, wherein the pin first portion includes the end portions of the pin and the second portion is disposed between the ends portions.

33. A floor box cover assembly comprising:

a flange including an opening therethrough to permit access to an outlet box;

a cover securable to the flange and movable between a closed position wherein the opening is covered and an open position wherein the opening is uncovered to permit access to the outlet box;

the flange including an inner wall and an outer wall extending about the opening, the inner and the outer walls defining a channel disposed therebetween; and the cover is pivotably securable to the flange by a hinge, the hinge including a resilient member that permits rotational and translational movement of the cover relative to the flange, and wherein the cover and outer wall form a gap therebetween when said cover is in the closed position, the gap permitting the cover to translate relative to the flange when in the closed position.

34. The floor box cover assembly as defined in claim 33, wherein the cover, when in the closed position is substantially flush with an upper surface of the flange.

35. The floor box cover assembly as defined in claim 33, wherein the cover includes a portion that selectively engages the flange, and upon movement of the cover into the closed position, that portion of the cover engages the flange resulting in the cover being releasably retained in the closed position and restricted from moving into the open position.

36. A floor box cover assembly comprising:

a flange including an opening therethrough to permit access to an outlet box;

a cover securable to the flange and movable between a closed position wherein the opening is covered and an open position wherein the opening is uncovered to permit access to the outlet box, and the cover being pivotably secured to the flange by a hinge and the cover being rotatable between an open and closed position, the hinge permitting translation of the cover such that the cover is translatable relative to the flange.

37. The floor box cover assembly as defined in claim 36, wherein the hinge includes a resilient member, and wherein deflection of the resilient member permits the cover to translate.

38. The floor box cover assembly as defined in claim 36, wherein the hinge includes a resilient member and a retainer, the retainer attaching the cover to the flange.

\* \* \* \* \*